(12) United States Patent
Harris et al.

(10) Patent No.: US 10,602,786 B2
(45) Date of Patent: Mar. 31, 2020

(54) LAMINATED ARTICLES AND METHODS OF MAKING AND USING THE SAME

(71) Applicant: Precision Fabrics Group, Inc., Greensboro, NC (US)

(72) Inventors: Philip Harris, High Point, NC (US); Barbara Lawless, Julian, NC (US)

(73) Assignee: Precision Fabrics Group, Inc., Greensboro, NC (US)

( * ) Notice: Subject to any disclaimer, the term of this patent is extended or adjusted under 35 U.S.C. 154(b) by 82 days.

(21) Appl. No.: 15/803,015

(22) Filed: Nov. 3, 2017

(65) Prior Publication Data

US 2018/0125127 A1    May 10, 2018

Related U.S. Application Data

(60) Provisional application No. 62/417,767, filed on Nov. 4, 2016.

(51) Int. Cl.
| | | |
|---|---|---|
| *A41D 13/12* | (2006.01) | |
| *B32B 37/20* | (2006.01) | |
| *B32B 37/30* | (2006.01) | |
| *B32B 5/00* | (2006.01) | |
| *B32B 7/12* | (2006.01) | |
| *B32B 37/12* | (2006.01) | |
| *B32B 37/14* | (2006.01) | |
| *B32B 37/16* | (2006.01) | |
| *B32B 43/00* | (2006.01) | |

(52) U.S. Cl.
CPC ............ *A41D 13/1209* (2013.01); *B32B 5/00* (2013.01); *B32B 7/12* (2013.01); *B32B 37/12* (2013.01); *B32B 37/144* (2013.01); *B32B 37/16* (2013.01); *B32B 37/20* (2013.01); *B32B 37/30* (2013.01); *B32B 43/003* (2013.01); *B32B 2250/03* (2013.01); *B32B 2305/18* (2013.01); *B32B 2307/54* (2013.01); *B32B 2307/724* (2013.01); *B32B 2323/10* (2013.01); *B32B 2437/00* (2013.01)

(58) Field of Classification Search
CPC .................................. A41D 13/1209
USPC .......................................... 428/98
See application file for complete search history.

(56) References Cited

U.S. PATENT DOCUMENTS

| | | | | |
|---|---|---|---|---|
| 3,609,767 A | * | 10/1971 | Grosz ................ | A41D 13/1209 2/114 |
| 3,745,587 A | * | 7/1973 | Bradley ............. | A41D 13/1236 2/114 |
| 4,504,978 A | * | 3/1985 | Gregory, Jr. ......... | A41D 27/245 2/114 |
| 5,141,800 A | | 8/1992 | Effenberger et al. | |
| 5,680,653 A | | 10/1997 | Mathis et al. | |
| 5,682,618 A | | 11/1997 | Johnson et al. | |
| 5,688,157 A | | 11/1997 | Bradley et al. | |
| 5,705,251 A | | 1/1998 | Morman et al. | |
| 5,761,801 A | | 6/1998 | Gebhardt et al. | |
| 5,883,028 A | | 3/1999 | Morman et al. | |
| 5,907,872 A | | 6/1999 | Alberts et al. | |

(Continued)

FOREIGN PATENT DOCUMENTS

WO     2004/037026     5/2004

*Primary Examiner* — Brent T O'Hern
(74) *Attorney, Agent, or Firm* — Myers Bigel, P.A.

(57) ABSTRACT

Described herein are laminated articles along with methods of making and/or using the same, including a continuous process for making laminated articles.

19 Claims, 4 Drawing Sheets

(56) References Cited

U.S. PATENT DOCUMENTS

| | | |
|---|---|---|
| 6,192,521 B1 | 2/2001 | Alberts et al. |
| H1969 H | 6/2001 | Fell et al. |
| H1978 H | 8/2001 | Freiburger et al. |
| H1989 H | 9/2001 | Fell et al. |
| H2011 H | 1/2002 | Freiburger et al. |
| 6,837,771 B2 | 1/2005 | Falla |
| 8,774,477 B2 | 7/2014 | Eichhorn et al. |
| 2006/0096003 A1 | 5/2006 | Plaatje et al. |

\* cited by examiner

LAMINATED ARTICLES AND METHODS OF MAKING AND USING THE SAME

RELATED APPLICATION DATA

This application claims the benefit of U.S. Provisional Patent Application Ser. No. 62/417,767, filed Nov. 4, 2016, the disclosure of which is incorporated by reference herein in its entirety.

FIELD

The present invention relates generally to laminated articles and to methods of making and/or using the same, including a continuous process for making laminated articles.

BACKGROUND

Surgical gowns are primarily intended to protect surgical staff from contact with bodily fluids and/or medical solutions. To achieve this, the gowns are typically manufactured with materials that function as barriers to these liquids. These barriers also tend to restrict, or even prevent, the flow of air to the skin of the gown wearer making them uncomfortable.

Some gown designs seek to maintain the barrier in the most critical locations (e.g., chest and sleeves) while reducing the barrier in less demanding areas (e.g. back and sides) of the gown; thus, providing avenues for air permeation and circulation. These approaches include seaming together fabrics with different barrier properties (e.g. the gown's front having a high barrier material and the back having a material that provides less of a barrier but higher air permeability), or manually laminating a high barrier fabric/film patch (often referred to as a "reinforcement") onto an area of the gown body.

A gown body may be a single high barrier material that is present throughout the entire gown body. The disadvantage with the single high barrier material embodiment is the lack of a pathway through the gown for air permeation/circulation.

Alternatively, a gown body may include seams where two different types of materials are sewn or sealed together so that the most critical areas on the gown (e.g., middle portion of chest) are made with barrier materials. The less demanding areas (e.g., sides and back) are made with a more air permeable, lower-barrier material to allow air circulation for the wearer. The seamed gown body design has several disadvantages. First, seams between different types of materials are often poor fluid barriers due to variability in manufacturing processes and the difficulty in achieving a continuous seal between the dissimilar materials. Seaming also requires additional material handling and manufacturing steps compared to a gown made from a single roll of fabric. This increases cost for labor, waste and variability in the manufacturing process.

Another current gown body has a barrier material that is glued in the form of a reinforcement to the most-critical area of the gown. While this design has no seams, laminating a barrier material reinforcement to a base material (e.g., a fabric) increases the number manufacturing steps, variability in product, labor cost, additional raw materials and waste from the process.

SUMMARY OF EXAMPLE EMBODIMENTS

One aspect of the present invention is directed to a method of manufacturing a laminated article, the method comprising laminating a barrier material to a fabric to form a laminate, wherein the fabric has a first width and the barrier has a second width, and the first width is different than the second width. Some embodiments include providing the laminate in the form of a roll stock, thereby preparing the laminated article. In some embodiments, the method comprises cutting the laminate, thereby preparing the laminated article. In some embodiments, the step of cutting the laminate is carried out by cutting an unrolled portion of the roll stock to form the laminated article. In some embodiments, the laminating step and the cutting step are carried out in a continuous process. In some embodiments, the method may provide a laminated article that is cut exactly from a laminate so that no selvage remains and/or no subsequent trimming and/or heat treatment is necessary on the laminated article. In some embodiments, a method of the present invention may eliminate the need for reinforcement in the laminated article and/or finishing of the laminated article.

Another aspect of the present invention is directed to a laminated article comprising: a barrier material; and a fabric, wherein a surface of the barrier material is laminated to a surface of the fabric, wherein the laminated article has a first width defined by the fabric and the barrier material has a second width, and the second width is less than the first width, and wherein the barrier material has a length that extends from a top edge of the laminated article to a bottom edge of the laminated article. In some embodiments, the laminated article does not comprise a seam or reinforcement (e.g., a patch). In some embodiments, the laminated article has no selvage.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

Figure 1:
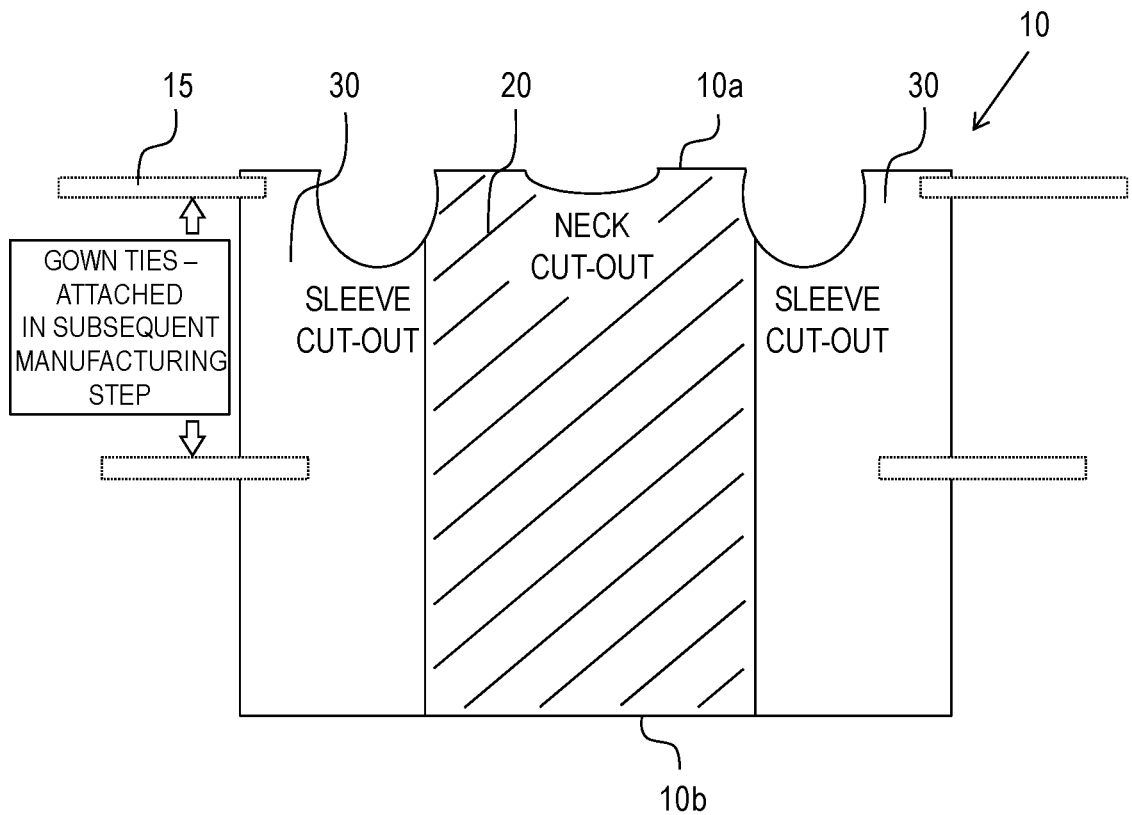
FIG. 1 illustrates a laminated article according to embodiments of the present invention that is used in a surgical gown.

The accompanying drawings, which are incorporated in and constitute a part of the specification, illustrate embodiments of the invention and, together with the description, serve to explain principles of the invention.

DETAILED DESCRIPTION OF EXAMPLE EMBODIMENTS

The present invention will now be described more fully hereinafter. This invention may, however, be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

The term "about," as used herein when referring to a measurable value such as an amount or concentration and the like, is meant to encompass variations of ±10%, ±5%, ±1%, ±0.5%, or even ±0.1% of the specified value as well as the specified value. For example, "about X" where X is the measurable value, is meant to include X as well as variations of ±10%, ±5%, ±1%, ±0.5%, or even ±0.1% of X. A range provided herein for a measurable value may include any other range and/or individual value therein.

Like numbers refer to like elements throughout. In the figures, the thickness of certain lines, layers, components, elements or features may be exaggerated for clarity. The abbreviations "FIG. and "Fig." for the word "Figure" can be used interchangeably in the text and figures.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of an element or laminate in use or operation in addition to the orientation depicted in the figures. For example, if the laminate in the figures is inverted, elements described as "under" or "beneath" other elements or features would then be oriented "over" the other elements or features. Thus, the exemplary term "under" can encompass both an orientation of "over" and "under." The laminate may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

Embodiments of the present invention are directed to laminated articles along with methods of making and using the same. In some embodiments, the laminated article may be a health care apparel item, such as, e.g. a medical gown body. In some embodiments, the laminated article may be in the form of roll stock. In some embodiments, the laminated article is prepared using a continuous process. A "continuous process" as used herein refers to a process in which two or more steps in the process are integrated into one such that material is simultaneously being added and discharged from the process. A continuous process is in contrast to a batch process where steps in the batch process are separate sequential steps. In some embodiments, a method of the present invention is a continuous process and/or has a line speed of about 300 to about 400 feet per minute (or greater), which may result in a dwell time in a heated nip of less than about 1 second, such as, e.g., less than about 0.5 seconds.

In some embodiments, a method of manufacturing a laminated article is provided that includes laminating a barrier material to a fabric to form a laminate, wherein the width of the fabric and the width of the barrier material are different. Some embodiments include providing the laminate in the form of a roll stock, thereby preparing the laminated article. In some embodiments, the method comprises cutting the laminate to form the laminated article. In some embodiments, the step of cutting the laminate is carried out by cutting an unrolled portion of the roll stock to form the laminated article. The laminate may be cut so that no selvage is provided and/or so that no subsequent trimming and/or heat treatment is needed to create the laminated article. In some, the laminated article may have one or more dimensions (e.g., a width and/or length) that is/are not changed since the laminated article is the final product or when the laminated article (e.g., a cut laminated article, such as, e.g., a medical gown body) is used in preparing a product (e.g., a medical gown). The laminating step and/or cutting step may be part of a continuous method to produce the laminated article. In some embodiments, the laminating step is a continuous process that produces the laminate in the form of roll stock. The roll stock may be provided and/or used in the cutting step, which may be carried out in a continuous process. In some embodiments, the laminating and cutting steps are incorporated into the same connected operation. In some embodiments, the barrier material and the fabric are not compatible (e.g., are not compatible for thermal bonding).

Figure 2:
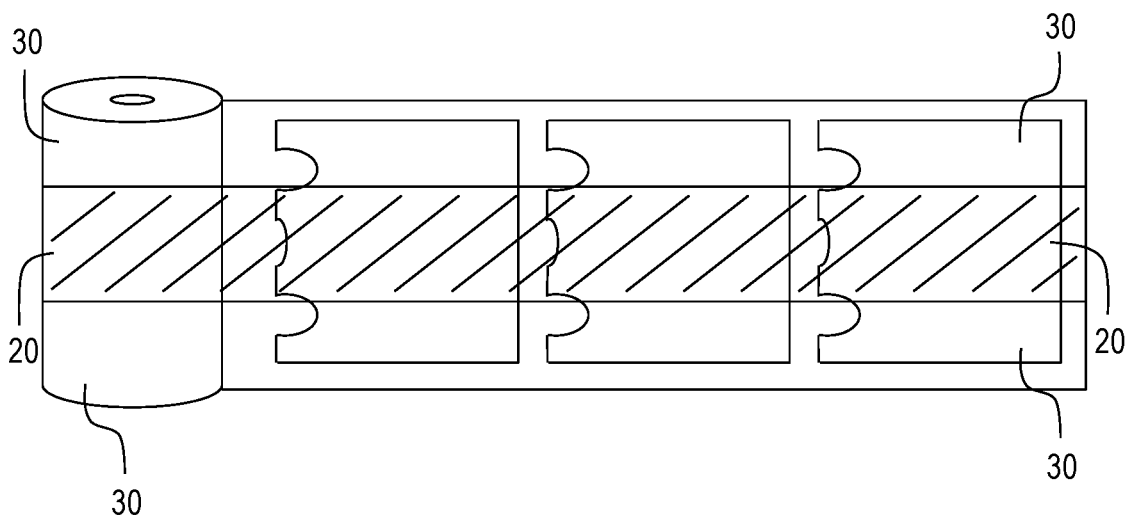
FIG. 2 illustrates a cut-out from roll stock according to embodiments of the present invention.

Referring now to FIG. 1, a laminated article 10 of the present invention may be a surgical gown body that is used to prepare a surgical gown and may be made up of a barrier material 20 and fabric 30 laminated together. Subsequent to a method of the present invention (e.g., a continuous process of the present invention), one or more gown ties 15 may be attached to the laminated article 10. As illustrated in FIG. 2, the entire laminated article 10 (e.g., gown body) may be cut from the laminate, which may or may not be provided from roll stock. Some advantages of creating a laminated article 10 with a one-step continuous process include, but are not limited to, low cost, high production rate and/or low product variability. In a process for preparing a seamed gown, a continuous process is not possible since at least two different materials (e.g., at least two different panel pieces from two different roll stocks that are used for preparing a medical gown body) are subsequently seamed together to create the gown body. Nor is a continuous process possible with a gown having a high barrier reinforcement since it requires gluing of the reinforcement in an operation after the step of cutting out the gown body, which adds another process with its associated variability and cost.

Figure 3:
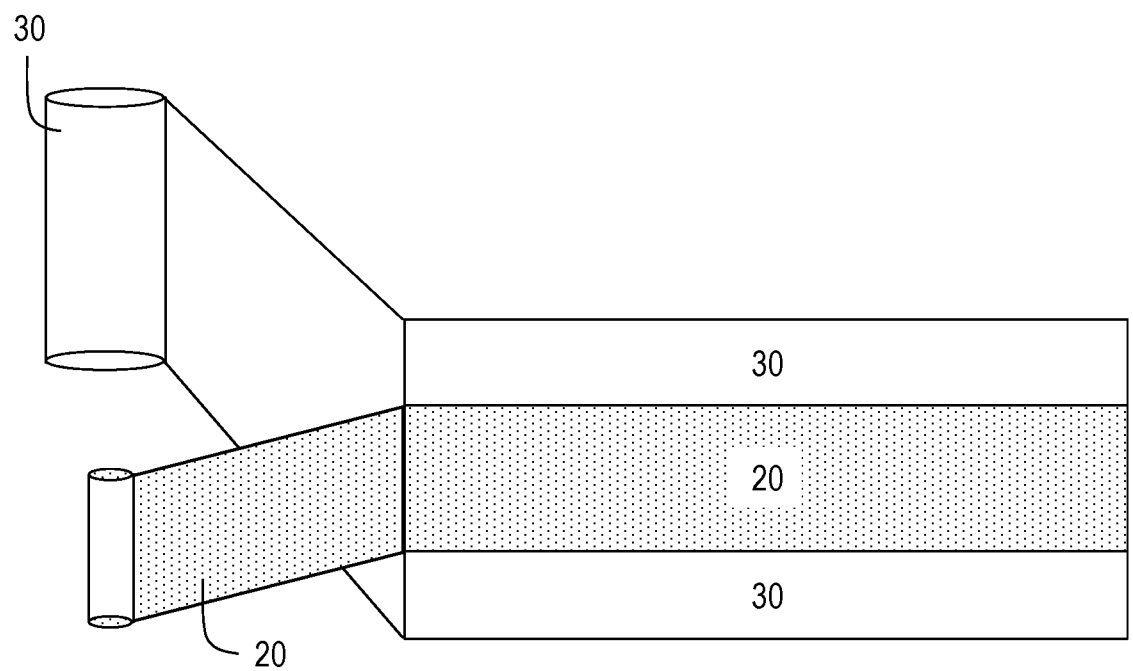
FIG. 3 illustrates a two zone laminate according to embodiments of the present invention.
Figure 4A:
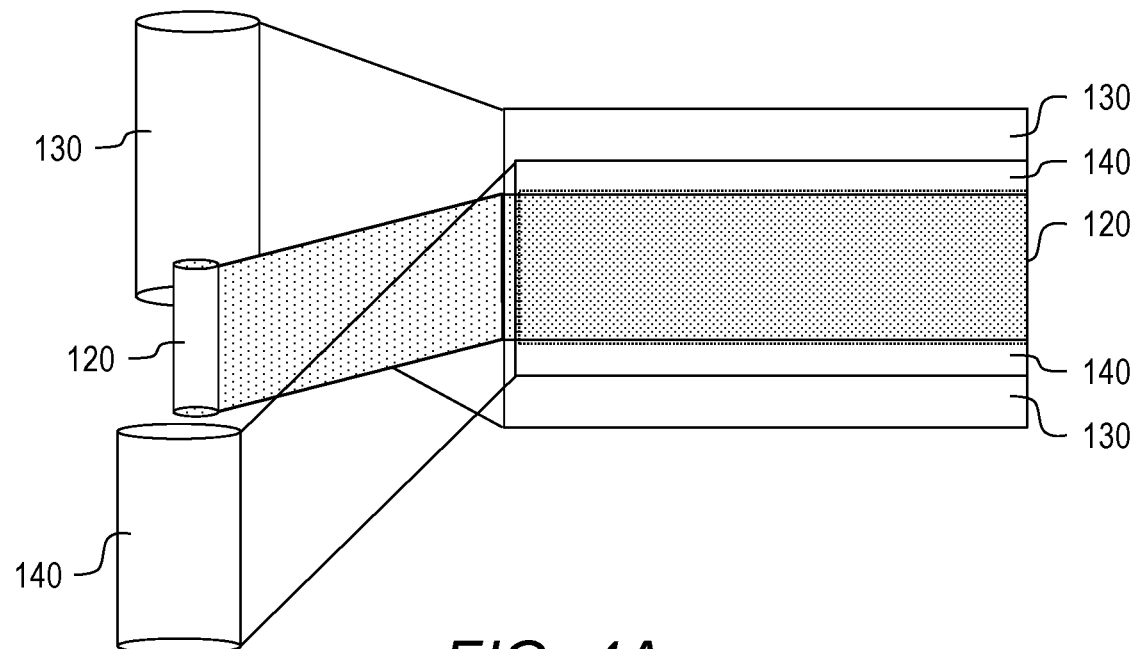
FIG. 4A illustrates a three zone laminate according to embodiments of the present invention.
Figures 4B, 4C:
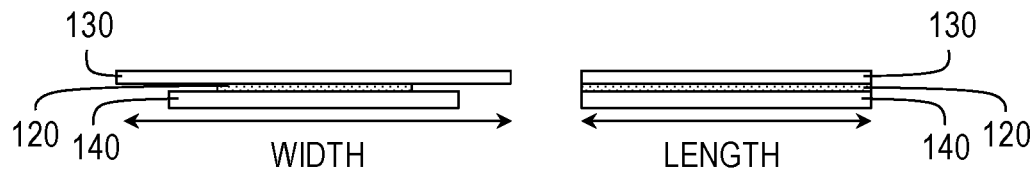
FIG. 4B illustrates a side view in the machine direction of the laminate of FIG. 4A according to embodiments of the present invention.
FIG. 4C illustrates a side view in the cross machine direction of the laminate of FIG. 4A according to embodiments of the present invention.

Some embodiments of the present invention provide a single-step, continuous cutting process that provides and/or places a barrier material in a critical area (e.g., middle portion of, chest) of the laminated article and a fabric in a less-demanding area (e.g., sides and back) of the laminated article without the introduction of seams and/or additional gluing steps. This may be accomplished by laminating rolls of a fabric and barrier material of dissimilar widths so that a narrower barrier material covers the critical area on the laminated article (e.g., gown body) and a wider fabric functions as the primary material of the laminated article. The barrier material 20 may laminated to the fabric 30 for a two layer structure (FIG. 3) or can be sandwiched between two (or more) layers of fabric (FIGS. 4A-4C) or between the fabric and a third material, which may have other desirable properties (e.g., desirable surface properties). As shown in FIG. 4A, a barrier material 120 is positioned between a first fabric 130 and a second fabric 140 to provide a laminate having three zones, a first zone in which the barrier material 120, first fabric 130, and second fabric 140 are present, a second zone in which only the first fabric 130 and second fabric 140 are present, and a third zone in which only the first fabric 130 is present. FIG. 4B illustrates the dissimilar widths of the materials using the view from the MD edge. FIG. 4C shows a cross section view from the CD edge. In some embodiments, the laminated article may be thermally and adhesively laminated, optionally in a continuous process (e.g., a one pass and/or one step continuous process). For example, the first fabric 130 may be adhesively laminated to the barrier material 120 and the second fabric 140 may be thermally laminated to the barrier material 120 and/or vice versa. In some embodiments, two or more of the layers of the laminated article are thermally and adhesively laminated together, optionally in a one pass continuous process.

Figure 5:
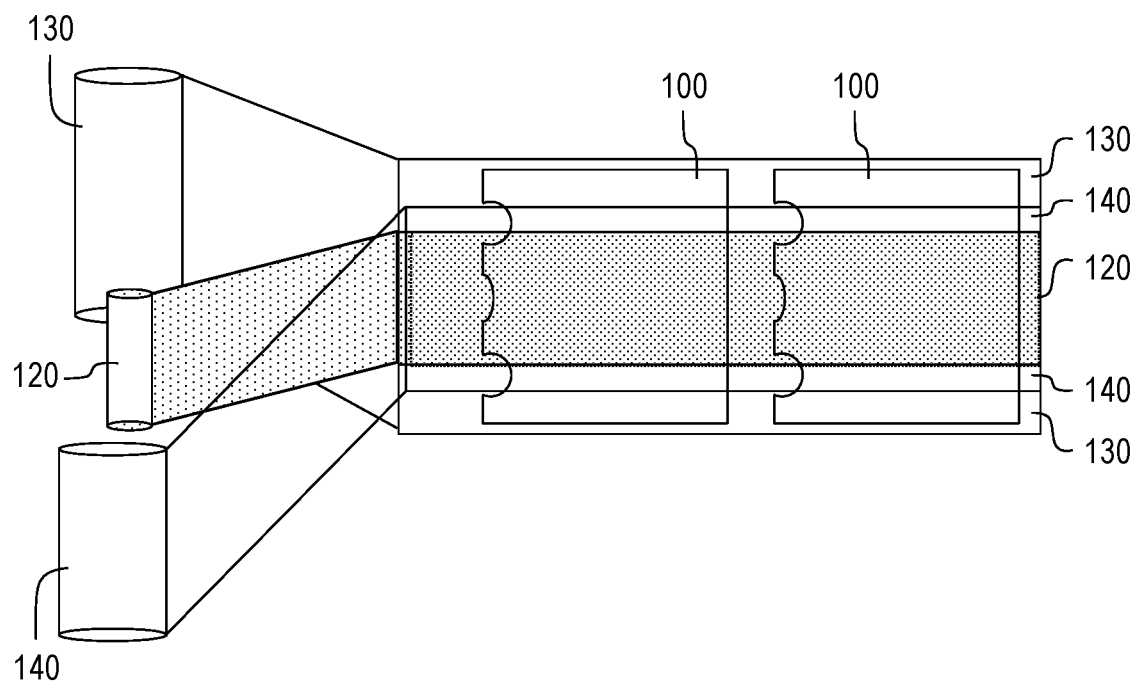
FIG. 5 illustrates a cut-out process for the laminate of FIG. 4A according to embodiments of the present invention.
Figure 6:
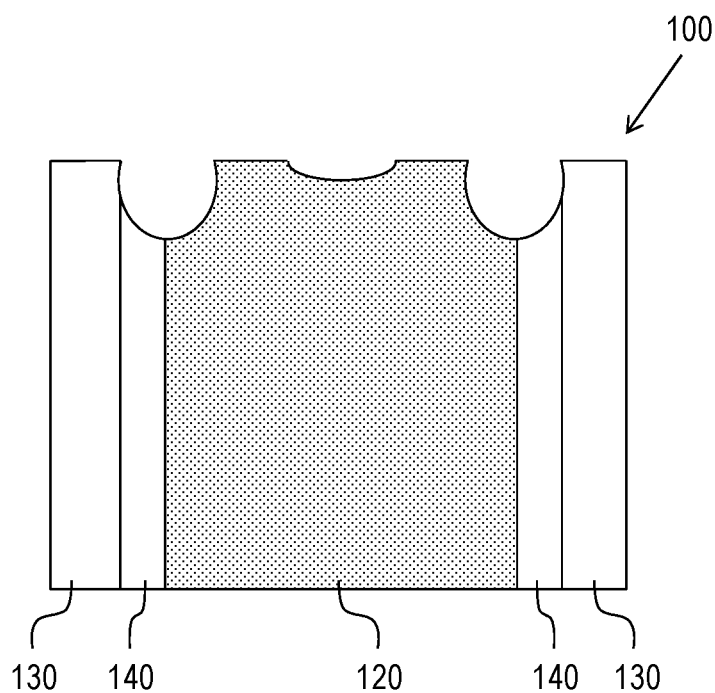
FIG. 6 illustrates a laminated article prepared from the laminate of FIG. 5 according to embodiments of the present invention.

FIG. 5 illustrates a final gown body cutout according to embodiments of the present invention. As can be seen in FIG. 5, the first fabric 130 covers the entire laminated article 100 (e.g., gown body), which may allow for air circulation, provide mechanical strength, and/or other desirable properties for the laminated article 100. The barrier material 120 is present only in the critical area, which may inhibit air permeation in the area in which the barrier material 120 is present and may minimally inhibit air permeation in areas in which it is not present. The second fabric 140 in FIG. 5 has a width that is less than the width of the first fabric 130 so that the second fabric 140 only covers a portion of the first fabric 130, but the width of the second fabric 140 is greater than the width of the barrier material 120 so that the second fabric 140 covers the entire barrier material 120. FIG. 6 illustrates the laminated article separate from the roll stock.

In some embodiments, different zones (e.g., areas where 1 or more materials are present) in a laminated article of the present invention may be used to create and/or provide different barrier/permeability properties in the laminated article. These properties may be achieved while using a continuous manufacturing process, which may eliminate manufacturing steps associated with seaming (e.g., seaming a medical gown body) or gluing a reinforcement (such as, e.g., on a medical gown body). This may result in a method with lower variability in barrier performance, lower waste, lower manufacturing cost, and/or lower inventory requirements compared to current methods (e.g., those associated with seaming a medical gown body or gluing a reinforcement on a medical gown body).

In some embodiments, the position of a barrier material on a fabric and/or the width of a barrier material compared to the width of a fabric may be affected by the geometry of the laminated article and/or where a material with barrier properties is desired. In some embodiments, a laminated article of the present invention may have a barrier protection level as defined by AAMI PB70, such as, e.g., a level 1, 2, 3, or 4 as defined by AAMI PB70. In some embodiments, a laminated article having two or more (e.g., 2, 3, or 4) levels of barrier protection/properties, such as, e.g., as defined by AAMI PB70, may be provided according to a method of the present invention. In some embodiments, a laminated article having three or more (e.g., 3, 4, 5, 6, or more) levels of barrier protection/properties may be provided according to a method of the present invention. For example, a laminated article may be provided where the barrier material provides a high barrier property (e.g., impermeable to moisture vapor permeation) and the fabric provides a low barrier property (e.g., permeable to moisture vapor permeation). For example, the fabric in the laminated article may be an AAMI level 2 and the barrier material in the laminated article may be an AAMI level 4.

The laminating step may be carried out by thermal bonding, ultrasonic bonding, and/or adhesive bonding. In some embodiments, a laminated article of the present invention may be prepared using ultrasonic bonding. In some embodiments, a laminated article of the present invention may be prepared using adhesive bonding. In some embodiments, a laminating step of the present invention may include thermally laminating the barrier material to the fabric. In some embodiments, a laminated article of the present invention may be prepared using adhesive bonding and thermal bonding. Thus, in some embodiments, two different laminating steps may be performed and/or carried out, optionally in a continuous process, to achieve a laminated article of the present invention.

In some embodiments, the laminating step may include ultrasonically bonding a barrier material to a fabric using appropriate settings of amplitude, pressure, and line speed (i.e., dwell time) on the laminator, and optionally a bond pattern (e.g., a bond pattern from about 4% to 35% impression area, in some embodiments about 18% impression area), to achieve a sufficient lamination bond (e.g., a minimum bond strength of about 10 grams/inch using method AATCC 136) without compromising the barrier properties (through pin-holes, etc.) of the barrier fabric. In some embodiments, a Branson 900 laboratory ultrasonic bonding unit set at about 20 to about 30 psi pressure on the horn, a line speed of about 0.1 to about 0.3 feet per second and about 70 to about 80% amplitude can create a laminate with appropriate bond strength and/or barrier properties.

In some embodiments, the laminating step may include thermally laminating a barrier material to a fabric with appropriate settings of temperature, pressure, line speeds (i.e. dwell time) and optionally a bond pattern (e.g., a bond pattern from about 4% to 35% impression area, in some embodiments about 18% impression area) to achieve a sufficient lamination bond (e.g., a minimum strength of about 10 grams/inch using method AATCC 136) without compromising the barrier properties (pin-holes, etc.) of the barrier fabric. In some embodiments, conditions used on the thermal-bonding laminator may be about 200 F to about 450 F on anvil and pattern bonding rolls temperatures, a pressure range of about 100 to about 800 pounds per linear inch (pli) between the bonding rolls and line speed of about 50 to about 1000 feet per minute.

The laminating step may include adhesively laminating the barrier material to the fabric. The process of joining two layers with an adhesive is referred to herein as "adhesive lamination". The term "adhesive" as used herein refers to any binder and/or chemical substance that can hold two layers together and/or cause them to stick together with a measurable force. For example, an adhesive may bond a film to another film that may comprise the same or a different material. Alternatively or in addition, an adhesive may bond a film to a fabric.

Any suitable adhesive may be used, such as, for example, a flame resistant adhesive material, water-based adhesive, solvent-based adhesive, hot melt adhesive, powder adhesive, web adhesive, and/or film adhesive. In some embodiments, the adhesive may be an aqueous, solvent, hot melt, thermoplastic or thermoset adhesive. Example adhesives that may be used include, but are not limited to, pressure sensitives, polyesters, acrylates, acetates, polyamides, ethylene vinyl acetates (EVAs), ethyl methacrylates (EMAs), polyolefins, thermoplastic polyurethanes, and/or reactive moisture cure urethanes. In some embodiments, the adhesive provides greater than 10 grams/inch of bond strength between the contiguous layers when tested in accordance with AATCC 136.

Some embodiments include that when an adhesive is applied to a surface an adhesive layer may be applied and/or formed. The adhesive layer may be substantially continuous or may be discontinuous and may cover at least about 5% and up to 100% of the surface as measured using microscopic examination of the coated surface. In some embodiments, an adhesive layer may be provided on a surface and the adhesive layer may cover at least about 5%, 10%, 20%, 30%, 40%, 50%, 60%, 70%, 80%, 90%, 95% or more of the surface. One or more layers of an adhesive (e.g., 1, 2, 3, 4, 5, or more) may be applied to a surface, which may provide one or more adhesive layers (e.g., 1, 2, 3, 4, 5, or more).

An adhesive may be applied to a surface using methods known to those of skill in the art. For example, an adhesive may be applied using gravure printing (e.g., aqueous or solvent base media), screen printing, knife over roll coating, spraying, transfer printing, adhesive web, gravure printing hot melt adhesive (e.g., thermoplastic polymer base pressure sensitive adhesive (PSA) or reactive thermoset base, e.g., moisture cure urethane), porous coat hot melt adhesive (e.g., thermoplastic polymer base PSA or reactive thermoset base, e.g., moisture cure urethane), slot coating (thermoplastic polymer base PSA or reactive thermoset base, e.g., moisture cure urethane), and/or powder sprinkling (via Schindler roll).

Fabrics that may be used to prepare and/or that may be present in a laminated article of the present invention, include, but are not limited to, a woven fabric and/or a nonwoven fabric. The fabric in a laminated article of the present invention may comprise one or more fabric layers (e.g., 1, 2, 3, 4, 5, or more fabric layers). In some embodiments, a fabric that is used to prepare and/or that is present in a laminated article of the present invention has a high air permeability and/or is impermeable to moisture and/or aqueous liquids. In some embodiments, at least a portion of the fabric will adhere to at least a portion of the barrier material.

Example woven fabrics include, but are not limited to, plain weaves, basket weaves, twill weaves, satin weaves, and/or fancy weaves including jacquard weaves and/or dobby weaves.

Example nonwoven fabrics include, but are not limited to, spun melt fabrics (e.g., spunbond-meltblown (SM) and spunbond-meltblown-spunbond (SMS)), stitchbonded fabrics, needlepunched fabrics, spunlaced fabrics, spunbonded fabrics, thermal bonded fabrics, powder bonded fabrics, chemical bonded fabrics, wet laid fabrics, resin bonded fabric, and/or air laid fabrics (e.g., air-laid pulp fabric). A nonwoven fabric layer that may be used to prepare and/or present in a laminated article of the present invention may be mechanically treated and/or have undergone any suitable mechanical treatment, including, but not limited to, calendaring, creping, embossing, and/or stretching. In some embodiments, a nonwoven fabric layer that may be used to prepare and/or present in a laminated article of the present invention may be and/or have been chemically treated for certain properties, such as, but not limited to, flame retardancy, oil, alcohol and/or water repellency, antistatic, antimicrobial, corrosion inhibition, color, opacity, dimensional stability, coefficient of friction, softness, drapability and/or the like.

In some embodiments, a fabric layer of the present invention may have a three-dimensional pattern, such as, for example, a three-dimensional pattern that mimics the three-dimensional texture of a woven textile (e.g., hopsack, terrycloth or twill).

Any suitable fiber may be used in a fabric and/or fabric layer of the present invention in any suitable amount. Fibers may be natural fibers or synthetic fibers. Examples of fibers include, but are not limited to, bamboo fibers, cotton fibers, flax fibers, hemp fibers, jute fibers, polylactic acid fibers, silk fiberswool (e.g., alpaca, angora, cashmere, chiengora, guanaco, llama, mohair, pashmina, sheep and/or vicuña) fibers, acrylic fibers, glass fibers, lyocell fibers, melamine fibers, modacrylic fibers, polyacrylonitrile (e.g., oxidized polyacrylonitrile) fibers, polyamide (e.g., nylon and/or aramid) fibers, polyester fibers, polyimide fibers, polylactic acid fibers, polyolefin (e.g., polyethylene and/or polypropylene) fibers, polyvinyl acetate fibers, polyvinyl alcohol fibers, rayon fibers, viscose fibers, modified viscose (e.g., silica-modified viscose) fibers, zylon fibers, and/or bicomponent fibers (e.g., fibers comprising a copolymer and/or fibers comprising two or more polymers (e.g., polyester and polypropylene)). In some embodiments, at least one layer in a fabric of the present invention comprises thermoplastic fibers. In some embodiments, a fabric and/or fabric layer of the present invention comprises polypropylene fibers, polyester fibers, polyethylene fibers, nylon fibers, and/or bicomponent fibers therefrom. In some embodiments, a fabric and/or fabric layer of the present invention (e.g., a nonwoven fabric layer) comprises polypropylene fibers, such as, but not limited to, fluorochemical-treated polypropylene fibers. In some embodiments, a fabric and/or fabric layer of the present invention comprises a polypropylene spun melt fabric (e.g., spunbond-meltblown (SM) and/or spunbond-meltblown-spunbond (SMS)).

The fabric may have a basis weight in a range of about 15 gsm to about 35 gsm, such as, e.g., about 20 gsm to about 30 gsm or about 15 gsm to about 25 gsm. In some embodiments, the basis weight of the fabric may be about 15, 20, 25, 30, or 35 gsm.

The fabric may have a thickness in a range of about 1 mil to about 20 mils, such as, e.g., about 2 mils to about 10 mils or about 4 mils to about 8 mils. In some embodiments, the fabric may have a thickness of about 1, 2, 3, 4, 5, 6, 7, 8, 9, 10, 11, 12, 13, 14, 15, 16, 17, 18, 19, or 20 mils. In some embodiments, the fabric may have a thickness of about 5 mils.

A laminated article of the present invention may be prepared using and/or include a barrier material that comprises a film and/or a barrier fabric. The barrier material in a laminated article of the present invention may comprise one or more barrier material layers (e.g., 1, 2, 3, 4, 5, or more fabric layers). In some embodiments, the barrier material comprises a film, such as, but not limited to, a pin-hole free microporous and/or monolithic film such as, e.g., a polypropylene, polyethylene, polyvinyl chloride (PVC), polyvinyl alcohol (PVOH), ethylene vinyl alcohol (EVOH), polyvinylidene chloride, polyvinylidene fluoride, polyethylene terephthalate (PET), polybutylene terephthalate (PBT), PET/PBT blends, ethylene vinyl acetate, and/or polyurethanes.

In some embodiments, the barrier material is a single layer (e.g., a single film layer or single barrier fabric layer). In some embodiments, the barrier material comprises a laminated construct comprising two or more layers (e.g., 2, 3, 4, 5, 6, or more layers). The laminated construct of the barrier material may comprise a high-barrier fabric laminated to a base fabric, a high-barrier fabric laminated to a film (e.g., a preformed or extruded film), a base fabric laminated to a film, a first base fabric laminated to a film that is laminated to a second base fabric, a first high-barrier fabric laminated to a film that is laminated to a high-barrier fabric and/or a high barrier fabric laminated to a film that is laminated to a base fabric. Example high-barrier fabrics include, but are not limited to, treated fabrics such as, e.g., fluorocarbon-treated spunbond polypropylene, SMS, MS, and laminates of polypropylene, polyethylene, ethylene vinyl alcohol, polyvinyl chloride (PVC), polyvinylidene chloride, polyvinylidene fluoride, PET, PBT, PET/PBT blends, ethylene vinyl acetate, and/or polyurethanes. In some embodiments, a high-barrier fabric may have a MVTR of less than 15,000 cfm/sf. A base fabric may be any suitable fabric as described herein, but the base fabric is part of the barrier material, which is laminated to a fabric to form a laminate.

The barrier material may have a thickness in a range of about 0.0001 inches to about 0.036 inches, such as, e.g., about 0.0001 inches to about 0.02 inches or about 0.001 inches to about 0.03 inches. In some embodiments, the barrier material may have a thickness of about 0.0001, 0.0003, 0.0005, 0.0007, 0.001, 0.003, 0.005, 0.008, 0.01, 0.02, 0.03, or 0.04 inches.

The barrier material may have a basis weight in a range of about 10 gsm to about 65 gsm, such as, e.g., about 10 gsm to about 40 gsm, about 45 gsm to about 60 gsm or about 50 gsm to about 65 gsm. In some embodiments, the basis weight of the barrier material may be about 10, 15, 20, 25, 30, 35, 40, 45, 50, 55, 60, or 65 gsm.

Referring again to FIG. 1, a laminated article 10 of the present invention may be a surgical gown and may be made up of a barrier material 20 and fabric 30 laminated together. The fabric 30 or at least one layer of the fabric 30 may make up the entire area of the laminated article 10, that is the fabric 30 or at least one layer of the fabric 30 of the laminate article 10 may cover all of the laminated article 10. Thus, the laminated article 10 and fabric 30 may have the same area and/or the same dimensions, size, and/or shape. In contrast, the barrier material 20 may make up only a portion of the laminated article 10. Thus, the barrier material 20 may have an area that is less than the area of the laminated article 10. In some embodiments, the barrier material 20 or one or more layers of the barrier material 20 may make up about 30% to about 85% of the area of the laminated article 10. In some embodiments, the barrier material 20 or one or more layers of the barrier material 20 may make up about 30%, 35%, 40%, 45%, 50%, 55%, 60%, 65%, 70%, 75%, 80%, or 85% of the area of the laminated article 10. The barrier material 20 may have a length that extends from a top edge of the laminated article 10a to a bottom edge 10b of the laminated article 10.

A laminated article 10 of the present invention does not include a sewn seam (e.g., a seam joining barrier material 20 to the fabric 30). In some embodiments, the laminated article 10 does not include a reinforcement, such as, e.g., a layer that does not extend from a top edge 10a of the laminated article 10 to the bottom edge 10b of the laminated article 10.

Referring again to FIG. 6, the laminated article 100 may comprise a second fabric 140. The barrier material 120 may be positioned between the first fabric 130 and the second fabric 140. The second fabric 140 may be the same as or different than the first fabric 130. In some embodiments, the second fabric 140 is the same material as the first fabric 130.

In some embodiments, a second fabric 140 may have an area that is less than the area of the laminated article 10 and/or the first fabric 130. In some embodiments, the second fabric 140 may have an area that is less than or greater than the barrier material 120. In some embodiments, the second fabric 140 may have an area greater than the barrier material 120.

A laminated article of the present invention may have at least two (e.g., 2, 3, 4, 5, 6, or more) different barrier properties. For example, a first barrier property may be provided by the fabric and second barrier property that is different than the first barrier property may be provided by the barrier material. In some embodiments, the laminated article may have at least two (e.g., 2, 3, 4, 5, 6, or more) different air permeability properties (e.g., one provided by the fabric and the other provided by the barrier material). For example, the barrier material of the laminated article may have an air permeability of less than about 0.5 cfm/sf (e.g., 0.4, 0.3, 0.2, or 0.1 cfm/sf or less) and the fabric of the laminated article may have an air permeability of greater than 10 cfm/sf (e.g., about 25, 50, 75, 100, 150, 200, 250, 300, 350, 400 cfm/sf or more) each as measured using ASTM D737 using air pressure of 125 pascals and 38 square cm orifice. In some embodiments, the laminated article may have at least two (e.g., 2, 3, 4, 5, 6, or more) different moisture/vapor transfer rates (MVTR). In some embodiments, a fabric may have a MVTR greater than 5000 cfm/sf as measured using ASTM D6701-01 and/or a barrier material may have a MVTR less than 15,000 cfm/sf as measured using ASTM D6701-01. A barrier material may pass the ASTM 1670 test and/or may pass the ASTM 1671 test. In some embodiments, a fabric may not pass the ASTM 1670 and/or ASTM 1671 test. At least a portion of the laminated article may be impermeable to fluids and/or gases. In some embodiments, the entire laminated article is impermeable to fluids. In some embodiments, at least a portion of the laminated article is permeable to moisture vapor and impermeable to liquid fluids. In some embodiments, at least a portion of the laminated article is permeable to moisture vapor and/or gases, such as, e.g., at least a portion of the laminated article that is not covered and/or in contact with the barrier material. A laminated article may minimize and/or prevent moisture and/or fluids from wicking around the barrier material when an exterior surface of the barrier material of the laminated article is exposed to moisture and/or fluids compared to an article comprising a reinforcement attached to a fabric.

In some embodiments, a barrier material of a laminated article of the present invention may have a hydrohead value of at least about 140 cm and/or the fabric of a laminated article of the present invention may have a hydrohead value of less than about 100 cm, each as measured using INDA IST 80.6. For example, the barrier material may have a hydrohead value of about 140, 150, 160, 170, 180, 190, 200, 210, 220, 230, 240, or 250 cm or more and/or the fabric may have a hydrohead value of about 100, 90, 80, 70, 60, 50, or 40 cm or less.

A laminated article may be cut in any suitable shape and/or size. In some embodiments, a laminated article may be in a shape of a medical gown body, as shown in FIG. 6. In some embodiments, a laminated article of the present invention may be cut to the exact (i.e., final) size of the finished product (e.g., a medical gown) to be prepared from the laminated article (e.g., a medical gown body) and may be cut with no selvage to be trimmed to provide a self-finished edge. A self-finished edge may be provided since the lamination process of a method of the present invention sufficiently binds the layers (e.g., barrier material and fabric) together to prevent fraying and/or delamination. In some embodiments, a laminated article and/or method of the present invention does not require heating subsequent to lamination, such as, e.g., to cure an adhesive to create final laminate.

A laminated article of the present invention may have a cross direction (XD) grab tensile strength of at least 8 lbs as measured using modified ASTM D5034. The XD grab tensile strength may be measured in the fabric and/or barrier material portion of the laminated article. In some embodiments, a laminated article of the present invention may have a XD grab tensile strength of about 8, 10, 12, 1, 16, 18, 20, 22, 24, 26, 28, or 30 lbs as measured using modified ASTM D5034.

A laminated article of the present invention may have a machine direction (MD) trap tear of at least 3 lbs as measured using modified ASTM D5733. The MD trap tear may be measured in the fabric and/or barrier material portion of the laminated article. In some embodiments, a laminated article of the present invention may have a MD trap tear of about 3, 4, 5, 6, 6, 7, 8, 9, 10, 11, 12, 13, 14, 15, 16, 18, or 20 lbs as measured using modified ASTM D5733.

A laminated article of the present invention may have a bond strength between any two contiguous layers of the laminated article (e.g. between a first fabric and a barrier material or between a second fabric and a barrier material) of at least about 10 g/in as measured using AATCC 136. In some embodiments, a laminated article of the present invention may have a bond strength between a fabric and a barrier material at least about 10, 50, 100, 250, 500, 750 or 1000 g/in as measured using AATCC 136.

In some embodiments, a laminated article of the present invention comprises: a barrier material; and a fabric, wherein a surface of the barrier material is laminated to a surface of the fabric, wherein the laminated article has a first width defined by the fabric and the barrier material has a second width, and the second width is less than the first width, wherein the barrier material has a length that extends from a top edge of the laminated article to a bottom edge of the laminated article, and wherein the laminated article does not comprise a seam or reinforcement. In some embodiments, the laminated article is cut exactly from a laminated material so that no selvage remains and/or no subsequent trimming and/or heat treatment is necessary on the laminated article.

In some embodiments, a method of the present invention may eliminate the need for reinforcement in the laminated article and/or finishing of the laminated article. This may be because the method provides and/or the laminated article has a smooth transition from the barrier material to fabric (e.g., from a higher barrier material to a lesser barrier material) with the barrier layer bound to at least one layer (i.e., the fabric) and, in some, in the middle of two layers (e.g., between two fabric layers).

EXAMPLES

Example 1

Figure 7:
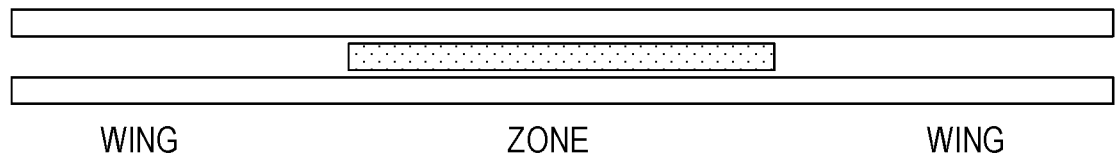
FIG. 7 illustrates a laminated article according to embodiments of the present invention.

A structure having two layers of 18 gsm light blue fluorochemical-treated polypropylene SMS (63" wide) with a layer of 22 gsm blue microporous polypropylene film (22"

wide) centered and sandwiched between them was prepared. The entire structure was thermally laminated and the edges of the roll were trimmed to 61" width as shown in FIG. 7. The physical properties of the laminated article are provided in Table 1. As shown in FIG. 7, the zone corresponds to the area where the barrier material is and the wing corresponds to the area where the fabric is.

TABLE 1

Physical properties for the laminated article of Example 1.
PHYSICAL PROPERTY SUMMARY
Level III Zone Laminate
Style Number: 6740-50000

| PROPERTY | TYPICAL VALUES (ZONE) | TYPICAL VALUES (WINGS) |
| --- | --- | --- |
| Basis Weight (osy) (INDA IST 130.1) | 1.69 | 1.04 |
| Caliper (in.) (ASTM D1777) | 0.010 | 0.009 |
| MD Bond Strength (g/in.) (AATCC #136) | 14.1 | 3.0 |
| XD Grab Tensile (lbs.) (ASTM D5034) | 18.2 | 12.9 |
| MD Trap Tear (lbs.) (ASTM D5733) | 5.3 12.1 | 4.1 |
| Hydro Head (cm) (INDA IST 80.6) | 200+ | 32.4 |
| Water Impact (grams) (INDA IST 80.3) | 0.01 | 0.095 |
| Martindale Abrasion (mg) (ASTM D4966, Option C) | 22.6 | 7.6 |
| Air Permeability (cfm/sf@125) (ASTM D737) | 0.0476 | 43.5 |
| MVTR (g/sq m/24 hr.) (MOCON) | 4998 | Not tested |
| MD Handle-O-Meter (grams) (INDA IST 90.3) | 14 | 6 |
| XD Handle-O-Meter (grams) (INDA IST 90.3) | 19 | 10 |
| MD/XD Static Decay, 20% RH (sec.) (INDA IST 40.2) | 1.84/0.86 | 1.71/0.72 |
| MD/XD Static Decay, 65% RH (sec.) (INDA IST 40.2) | 0.01/0.01 | 0.01/0.01 |
| Synthetic Blood Resistance (ASTM F1670) | PASS | FAIL |

Example 2

A structure having one layer of wide-width (e.g., 63") 34-gsm repellent/antistat-treated polypropylene SMS (AAMI Level 3) with a narrow-width (e.g., 22") & centered middle layer of breathable 25-gsm polypropylene microporous film and an opposing narrow-width (e.g., 23") & centered layer of 18-gsm untreated polypropylene SMS was prepared. The entire structure was ultrasonically- or thermally-bonded with a diamond pattern at 18% bond area. The center passes AAMI Level 4.

Example 3

Figure 8:
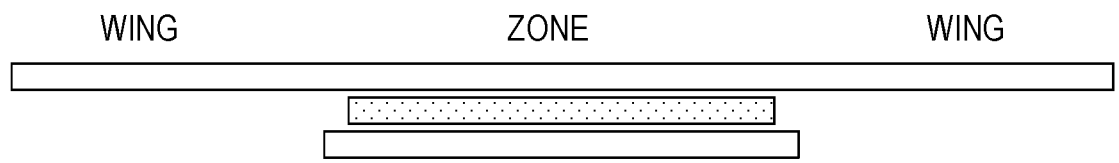
FIG. 8 illustrates another laminated article according to embodiments of the present invention.

A structure having one layer of wide-width (e.g., 63") 44-gsm repellent/antistat-treated polypropylene SMS (AAMI Level 3) with a narrow-width (e.g., 22") & centered middle layer of non-breathable 23-gsm polypropylene film and an opposing narrow-width (e.g., 23") & centered layer of 22-gsm hydrophilic polypropylene SMS was prepared. The entire structure is ultrasonically- or thermally-bonded with a diamond pattern at 18% bond area as shown in FIG. 8. The center passes AAMI Level 4.

The foregoing is illustrative of the present invention, and is not to be construed as limiting thereof. The invention is defined by the following claims, with equivalents of the claims to be included therein. All publications, patent applications, patents, patent publications, and other references cited herein are incorporated by reference in their entireties for the teachings relevant to the sentence and/or paragraph in which the reference is presented.

That which is claimed is:

1. A laminated gown body comprising:
   a barrier material comprising a pin-hole free microporous film and/or monolithic film; and
   a fabric, wherein a surface of the barrier material is laminated to a surface of the fabric,
   wherein the laminated gown body has a first width defined by the fabric and the barrier material has a second width, and the second width is less than the first width,
   wherein the barrier material has a length that extends from a top edge of the laminated gown body to a bottom edge of the laminated gown body, and
   wherein the laminated gown body does not comprise a seam or reinforcement, and wherein the laminated gown body has no selvage.

2. The laminated gown body of claim 1, wherein the barrier material is adhesively and/or thermally laminated to a surface of the fabric.

3. The laminated gown body of claim 1, wherein the pin-hole free microporous film and/or monolithic film comprises a polypropylene, polyethylene, polyvinyl chloride (PVC), polyvinyl alcohol (PVOH), ethylene vinyl alcohol (EVOH), polyvinylidene chloride, polyvinylidene fluoride, polyethylene terephthalate (PET), polybutylene terephthalate (PBT), PET/PBT blend, ethylene vinyl acetate, and/or polyurethane.

4. The laminated gown body of claim 1, wherein the pin-hole free microporous film and/or monolithic film comprises a polypropylene, polyvinyl chloride (PVC), polyvinyl alcohol (PVOH), polyvinylidene chloride, polyvinylidene fluoride, polybutylene terephthalate (PBT), and/or polyurethane.

5. The laminated gown body of claim 1, wherein the fabric is a woven fabric or a nonwoven fabric.

6. The laminated gown body of claim 1, wherein the fabric is a spunlace fabric, spunbond fabric, resin bonded fabric, thermal bonded fabric, air-laid pulp fabric, stitch-bonded fabric, spunbond-meltblown (SM), spunbond-meltblown-spunbond (SMS), and/or needlepunch fabric.

7. The laminated gown body of claim 1, wherein the fabric comprises a polypropylene fiber, optionally a fluorochemical-treated polypropylene fiber.

8. The laminated gown body of claim 1, wherein the barrier material further comprises a barrier fabric.

9. The laminated gown body of claim 1, wherein the barrier material including the pin-hole free microporous film and/or monolithic film comprises a laminated construct, and the laminated construct comprises a high-barrier fabric laminated to a base fabric, a high-barrier fabric laminated to the film, a base fabric laminated to the film, a first base fabric laminated to the film that is laminated to a second base fabric, a first high-barrier fabric laminated to the film that is laminated to a high-barrier fabric, and/or a high barrier fabric laminated to the film to laminated to a base fabric, wherein the high barrier fabric is a barrier fabric having a moisture/vapor transfer rate (MVTR) of less than 15,000 cfm/sf.

10. The laminated gown body of claim 1, wherein the laminated gown body has an area, and the fabric has an area that is the same as the area of the laminated gown body and the barrier material has an area that is less than the area of the laminated gown body.

11. The laminated gown body of claim 1, wherein the barrier material makes up about 30% to about 85% of the area of the laminated gown body.

12. The laminated gown body of claim 1, wherein the laminated gown body further comprises a second fabric, and the barrier material is positioned between the fabric and the second fabric, optionally wherein the second fabric comprises the same material as the fabric.

13. The laminated gown body of claim 1, wherein at least a portion of the laminated gown body is impermeable to fluids and/or gases, at least a portion of the laminated gown body is permeable to moisture vapor and impermeable to liquid fluids, and/or at least a portion of the laminated gown body is permeable to gases.

14. The laminated gown body of claim 1, wherein the barrier material has a thickness in a range of about 0.0001 inches to about 0.036 inches.

15. The laminated gown body of claim 1, wherein the barrier material has a hydrohead value of at least 140 cm and the fabric has a hydrohead value of less than 100 cm, each as measured using INDA IST 80.6.

16. The laminated gown body of claim 1, wherein the barrier material has an air permeability of less than 0.5 cfm/sf and the fabric has an air permeability of greater than 10 cfm/sf, each as measured using ASTM D737.

17. The laminated gown body of claim 1, wherein the laminated gown body has a cross direction (XD) grab tensile strength of at least 8 lbs as measured using modified ASTM D5034 and/or a machine direction (MD) trap tear of at least 3 lbs as measured using modified ASTM D5733.

18. A method of manufacturing the laminated gown body of claim 1, the method comprising:
 laminating a barrier material to a fabric to form a laminate, wherein the fabric has a first width and the barrier has a second width, and the first width is different than the second width;
 providing the laminate in the form of a roll stock; and
 optionally cutting the laminate from an unrolled portion of the roll stock to form the laminated gown body; and
 optionally wherein the laminating step and the cutting step may be carried out in a continuous process.

19. The method of claim 18, wherein the laminating step comprises adhesively laminating and/or thermally laminating the barrier material to the fabric.

\* \* \* \* \*

UNITED STATES PATENT AND TRADEMARK OFFICE
CERTIFICATE OF CORRECTION

PATENT NO. : 10,602,786 B2
APPLICATION NO. : 15/803015
DATED : March 31, 2020
INVENTOR(S) : Harris et al.

Page 1 of 1

It is certified that error appears in the above-identified patent and that said Letters Patent is hereby corrected as shown below:

In the Specification

Column 13, Line 25, Table 1: Please remove "12.1"

Signed and Sealed this
First Day of September, 2020

Andrei Iancu
*Director of the United States Patent and Trademark Office*